United States Patent [19]

Lama et al.

[11] Patent Number: 4,801,978

[45] Date of Patent: Jan. 31, 1989

[54] IMAGE BAR PRINTER COMPENSATED FOR VIBRATION-GENERATED SCAN LINE ERRORS

[75] Inventors: William L. Lama, Webster; Robert P. Loce, Rochester; John A. Durbin, Webster, all of N.Y.

[73] Assignee: Xerox Corporation, Stamford, Conn.

[21] Appl. No.: 139,391

[22] Filed: Dec. 30, 1987

[51] Int. Cl.$^4$ .............................................. G03B 27/72
[52] U.S. Cl. ..................................... 355/69; 346/160; 355/1; 355/14 E; 358/300
[58] Field of Search ............... 355/3 R, 8, 69, 1, 14 R, 355/14 E; 346/160; 358/300

[56] References Cited

U.S. PATENT DOCUMENTS

| | | | |
|---|---|---|---|
| 4,193,679 | 3/1980 | Mochizuki et al. | 355/1 |
| 4,307,409 | 11/1981 | Greenig et al. | 346/108 |
| 4,414,583 | 11/1983 | Hooker | 358/300 |
| 4,472,046 | 9/1984 | Kohyama | 355/1 |
| 4,477,175 | 10/1986 | Snelling | 355/3 R |
| 4,699,497 | 10/1987 | Hinton et al. | 355/14 E |
| 4,699,502 | 10/1987 | Araki et al. | 355/69 X |
| 4,701,670 | 10/1987 | Watanabe et al. | 355/69 X |
| 4,711,566 | 12/1987 | Evans | 355/69 X |

Primary Examiner—Fred L. Braun

[57] ABSTRACT

In an electronic printer which utilizes an image write bar, a control circuit is provided to compensate for the effects of vibration in a rotating photoconductive member, typically a photoreceptor drum. In one embodiment an encoder is positioned so as to detect spatial displacements of indicia affixed to the photoconductor surface, Correction signals are generated and sent to control circuits which adjust the on/off timing of the write bar operation and/or the intensity of the image bar output. This adjustment results in compensation for the effects of photoconductor vibration.

3 Claims, 8 Drawing Sheets

FM 1. CORRECT TURN-ON TIME

FM 2. CORRECT TURN-ON AND TURN-OFF TIME

AM CORRECT INTENSITY

FAST

NOMINAL

SLOW

FM + AM CORRECT (TURN-OFF AND INTENSITY CORRECTION)

FAST

NOMINAL

SLOW

IMAGE BAR PRINTER COMPENSATED FOR VIBRATION-GENERATED SCAN LINE ERRORS

BACKGROUND AND INFORMATION DISCLOSURE STATEMENT

This invention relates to an electronic copier or printer of the type which uses an addressable image writing array (write bar) to form images on a moving photoreceptor surface. More particularly, the invention is directed towards a control system for compensating for errors in imaged scan lines due to mechanical vibration present in the photoreceptor.

In document reproduction systems which incorporate scanning illumination systems (moving illumination sources, reflectors, projection lens) to project an image onto a moving photoreceptor, it is known that undesirable exposure strobing can result from mechanical vibrations of the various components comprising the optical system.

U.S. Pat. No. 4,699,497 describes a method and apparatus for compensating for the effects of vibration of a scanning illumination lamp as it accelerates through a scan cycle. The compensation for this system relies on increasing the natural frequency of the illumination lamp to nullify the effects of the lamp vibration.

Another common cause of strobing in prior art, light lens systems is the non-uniform (vibrational) motion of the photoreceptor, whether of the drum or belt type, in copending application Ser. No. 910,708 assigned to the same assignee as the present invention, there is disclosed an optical transmission filter which is placed in the optical path. The filter has specified transmittance characteristics which result in reduction or elimination of the stobing.

Mechanical vibration of the photoreceptor is also a problem in imaging systems of the type in which an image writing array is addressed by an image signal input. The array, or image bar, generates line-like image ray patterns, represesative of the image signal input, on the surface of a photoreceptor, Examples of image bar type of printers are found in U.S. Pat. No. 4,477,175, where the image bar is composed of a plurality of individually activated illumination elements (LEDs), and in U.S. Pat. No. 4,389,659 where the image bar is composed of a plurality of individually activated electro-optic electrodes. For these types of printing systems, photoreceptor vibration can cause periodic modulation in the gray regions, a phenomenon known as banding. Periodic exposure modulation in raster-generated images is the digital analog of exposure strobing caused by mechanical vibrations in scanning-type copiers. Resultant output copies are subject to solid area exposure non-uniformity banding in half tones and variations in line width.

The present invention is therefore directed towards a mechanism for detecting photoreceptor vibrations in an image bar type printing system and for generating signals to control the on/off time and the radiance of the image bar to compensate for the periodic modulation. More particularly, the invention relates to an image bar printing apparatus including an image write bar, a photoconductive member adapted for movement though an exposure station, image signal source means connected to said image write bar, said write bar generating a light output represestaive of said signal source input, a lens array cooperating with said image bar to form line-like images on said photoconductive member as the member moves through said exposure station, a pixel clock for controlling the on-off time of said image write bar, means for generating electrical signals representative of at least velocity motion changes in the photoconductive member due to vibrational forces, and logic and control circuitry for operating on said electrical signals and for generating at least a first output signal which adjusts the time-dependent radiance of said image bar to compensate for said velocity motion changes The following disclosures appear to be relevant.

U.S. Pat. No. 4,414,583 to Hooker, discloses a scanned light beam imaging apparatus including a frequency modulator (FM) 80 and an amplitude modulator (AM) 61 for controlling the movement of a light beam, orthogonally with respect to a scan direction for breaking up any unscanned or overlapped interstices between adjacent scan lines.

U.S. Pat. No. 4,307,409 to Greenig et al discloses a beam feedback synchronization system, wherein character clock signals are synchronized with electrical signals outputted from a photodetector, in response to light entering fiber optic elements, to compensate for variations in the speed of a light beam across a fiber optic array.

DESCRIPTION OF THE INVENTION

Figure 1:
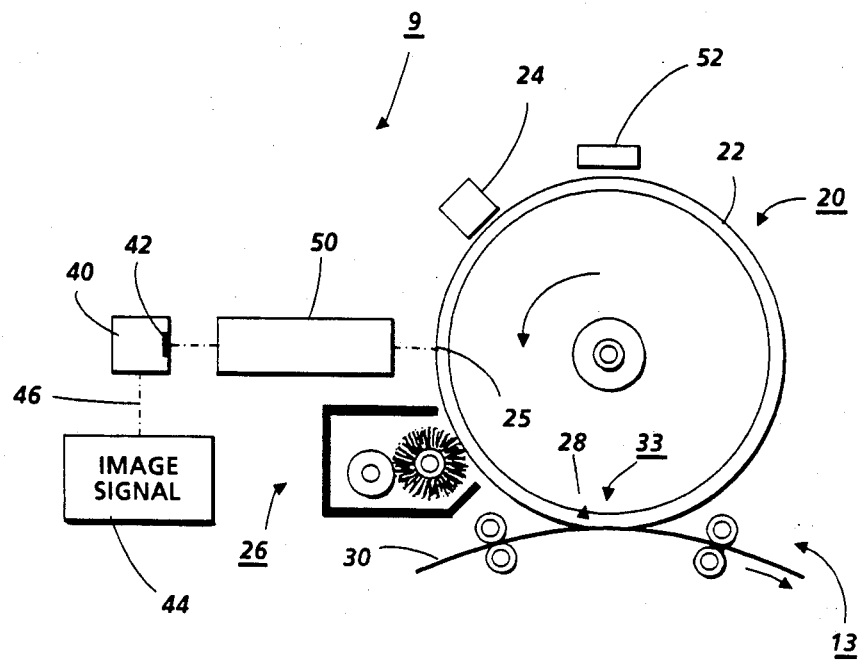
FIG. 1 is a view in cross section showing an image bar printing system.

FIG. 1 shows a printer which utilizes a full width, LED type write bar and which incorporates the exposure compensation feedback circuit of the present invention. The invention may be used in other types of imaging systems employing, for example, LCD (liquid crystal displays) or electro-optic displays as the "write" source.

As shown in FIG. 1, exemplary printer 9 includes a xerographic system in which the imaging member 20 comprises a photoreceptor drum 22 supported for rotation in a suitable housing or enclosure (not shown). A suitable motor (not shown) rotates drum 22 in the direction shown by the solid line arrow upon actuation of copier 9. A corona charging device such as corotron 24 is disposed in operative relationship with drum 22, corotron 24 serving to place a uniform electrostatic charge on photoconductive drum 22 preparatory to exposure thereof.

Photoconductive drum 22 is exposed at an exposure station 25 downstream of corotron 24 in a manner to be more fully described hereinbelow, such exposure creating a latent electronstatic image on the surface of photoconductive drum 22. Following exposure, the latent electrostatic image on photoconductive drum 22 is developed at development station 26

Following development of the latent electrostatic image, the developed image is transferred at transfer station 28 to a suitable copy substrate material shown here as a sheet 30 of copy paper brought forward in timed relation to arrival of the developed image. The copy sheet 30 bearing the developed image is carried to a suitable fusing or fixing device (not shown) where the toner image is permanently adhered to the copy sheet 30. An image write bar 40, which may, for example, comprise a plurality of light emitting diodes (LEDs) 42 is provided. LEDs 42 are disposed in one or more linear arrays or rows. Image signals from an image signal source 44 are connected to bar 40 through an input line 46. Source 44 can be a data communication channel, raster input scanner or the like. Bar 40 incorporates suitable circuitry including a pixel clock to selectively activate LEDs 42 (control on -off time) in response to the image input signal. The image rays from bar 40 are coupled into a lens array 50 which preferably comprises a plurality of gradient index lens optical fibers arranged in one or more linear rows. Lens array 50 transmits a focussed line image onto the surface of drum 20 at the exposure station.

A position encoder 52 is located adjacent to the surface of the photoconductor drum 20. The encoder reads a frequency bar chart on the surface of the drum 20 and sends signals into a control circuit described below in connection with FIG. 3.

As the writing bar exposes photoreceptor 20, any vibration by the photoreceptor in the process direction (perpendicular to the raster lines) will cause undesirable variation in lines and patterns running across the process (parallel to the raster lines). The exposure received by a line on the photoreceptor at the spatial coordinate x' is given by:

$$E(x') = \int_{-\infty}^{\infty} H_1(x)H_2(t)/v(t)dx$$

where $H_1(x)$ is the spatial variation of the image bar irradiance profile in the process direction (x), and $H_2(t)$ describes the time variation of the desired irradiance pattern (eg. on at time 0, off at time $t_1$, with constant irradiance). $H_2(t)$ is the "on/off" bit pattern of a single writing element (pixel) as it varies in time. The velocity of the photoreceptor, with an unwanted vibration, is given by:

$$v(t) = v_0 + a \cos(2\pi ft)$$

where $v_o$ is the constant nominal velocity and a is the amplitude of the velocity modulation of temporal frequency f. The relationship between time and position on the photoconductor is given by:

$$t = \frac{x - x'}{v_o} - \frac{a}{2\pi f v_o} \sin(2\pi ft)$$

where x' is an arbitrary initial position on the photoconductor.

To compensate for the velocity error and eliminate the line variation, correction must be made either to the on/off timing of the image bar (FM), or the time dependent radiance (AM) of the bar or, as will be seen to a combination of the two corrections.

To illustrate the problem and the proposed methods of correction, consider the schematic photoconductor exposure pattern shown in FIG. 2. In the absence of vibrations, the photoconductor velocity is its nominal value $v_o$ and the image bar exposes the photoconductor in the desired pattern shown in FIG. 2a, center illustration. If the photoconductor velocity is faster than nominal, the exposed areas on the photoconductor will be wider than nominal, they will be spaced farther apart than nominal, and they will have reduced exposure, as shown by the top illustation in FIG. 2a. When the photoconductor velocity is slower than nominal, the errors will be reversed, as shown by the bottom illustration of FIG. 2a. Partial FM correction involves turning on the exposures at the right times, as shown in FIG. 2b. However, the exposed widths on the photoconductor will still be in error, FIG. 2b, unless the turn-off times are also adjusted to compensate for the vibrations, as shown in FIG. (2c). Now the exposed areas are dimensionally correct, but the exposure values are still in error. The exposure values can be corrected by intensity modulation (AM) alone, as shown by FIG. 2d, but the FM errors remain. FIG. 2e shows that the combination of FM and AM correction is required to completely compensate for the motion error.

To illustrate the principle of FM correction, analytically consider exposing a single line of desired width $W_o$ and exposure level $E_o$. If the photoconductor is exposed for a nominal time $t_o = W_o/v_o$, by an ideal infinitely narrow irradiance distribution, $H_2(x) = \delta(x)$, the actual width $W_1$ of the expsoure profile will be given by $$\begin{aligned} W_1(t_o) &= \int_o^{t_o} v(t)dt = \int_o^{t_o} [v_o + a \cos(2\pi ft)]dt \\ &= v_o t_o + \frac{a}{2\pi f} \sin(2\pi ft_o) \\ &= W_o + e \sin(2\pi ft_o) \end{aligned}$$

which has an error of magnitude $e = a/2\pi f$. To eliminate this line-width error, the on-time must be adjusted to a value $t_1$ such that $W_1(t_1) = W_o$. That is, $$W_1(t_1) = v_o t_1 + e \sin(2\pi ft_1) = W_o = v_o t_o$$

or $$t_1 + \frac{e}{v_o} \sin(2\pi ft_1) = t_o$$

This transcendental equation can be solved for the required on-time $t_1$ in terms of the nominal on-time $t_o$ and e, $v_o$ and f.

Figure 2A:
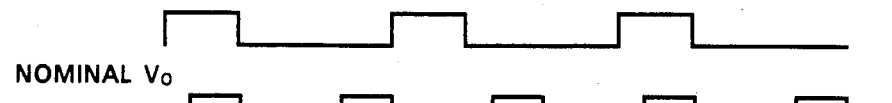
FIG. 2a–2e show a series of corrected and uncorrected bar pattern exposure profiles on a photoreceptor subject to vibration.
Figure 2A:
Figure 2B:
Figure 2B:
Figure 2B:
Figure 2C:
Figure 2C:
Figure 2C:
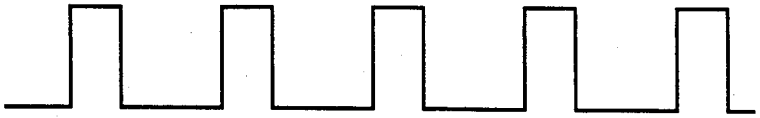
Figure 2D:
Figure 2D:
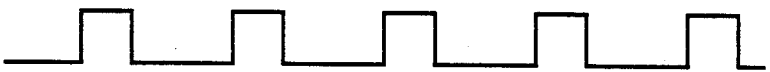
Figure 2D:

The FM corrected line exposure pattern is now given by $$E(x') = \int_{-\infty}^{\infty} H_1(x)H_2(t)/v(t)dx = \int_{-\infty}^{\infty} H_1(x)rect(t/t_1)/v(t)dx$$

where $H_2$ is a rectangle of the correct width $W_o$, ie the on-time has been corrected. The encoder and feedback system also space the pixels, lines, etc. at the proper distance. Thus, the geometrical properties of the image by FM correction (FIG. 2c) are made properly However, as FIG. 2c shows, the line exposure still depends on the variable velocity v(t) and will not equal the desired constant exposure $E_o$. Thus FM correction is only partially complete. This approach can of course be applied to any pattern of lines and solid areas.

In order to completely eliminate the unwanted effects of vibration, AM correction must be employed wherein the irradiance of the image bar is corrected in real time to provide the correct level in the presence of vibrations. This is achieved by multiplying the irradiance function, $H_2(t)$, by an amplitude function $H_3(t)$, which controls the level of irradiance, with the property that $$H_3(t) = \frac{v(t)}{v_o}$$

Then the exposure pattern will be given by $$E(x') = \int_{-\infty}^{\infty} H_1(x)H_2(t)H_3(t)/v(t)dx$$

$$= \int_{-\infty}^{\infty} H_1(x)H_2(t)/v_o dx$$

which has been corrected for the time-varying photoconductor velocity. However AM correction alone is not complete either since the on-time (write command) is not corrected to account for the vibration. This can be seen by substituting for the time variable in $H_2$ where $$t = \frac{x-x'}{v_o} + \frac{e}{v_o}\sin(2\pi ft)$$

The lowest order solution of this equation is $$t = \frac{x-x'}{v_o} + \frac{e}{v_o}\sin\left[\frac{2\pi f}{v_o}(x-x')\right]$$

Which yields $E(x') =$ $$\frac{1}{v_o}\int_{-\infty}^{\infty} H_1(x)H_2\left[\frac{x-x'}{v_o} + \frac{e}{v_o}\sin\left(\frac{2\pi f}{v_o}(x-x')\right)\right]dx$$

It is clear that this resulting exposure is not exactly equal to the exposure in the absence of vibrations, which is given by $$E(x') = \frac{1}{v_o}\int_{-\infty}^{\infty} H_1(x)H_2\left[\frac{x-x'}{v_o}\right]dx$$

Figure 2E:
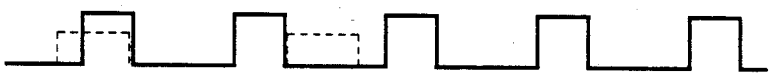
Figure 2E:
Figure 2E:
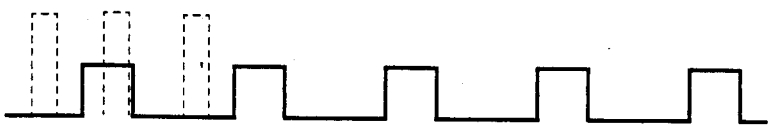

Thus AM correction likewise only addresses part of the problem. Both AM and FM corrections are needed as illustrated in FIG. 2e.

Figure 3:
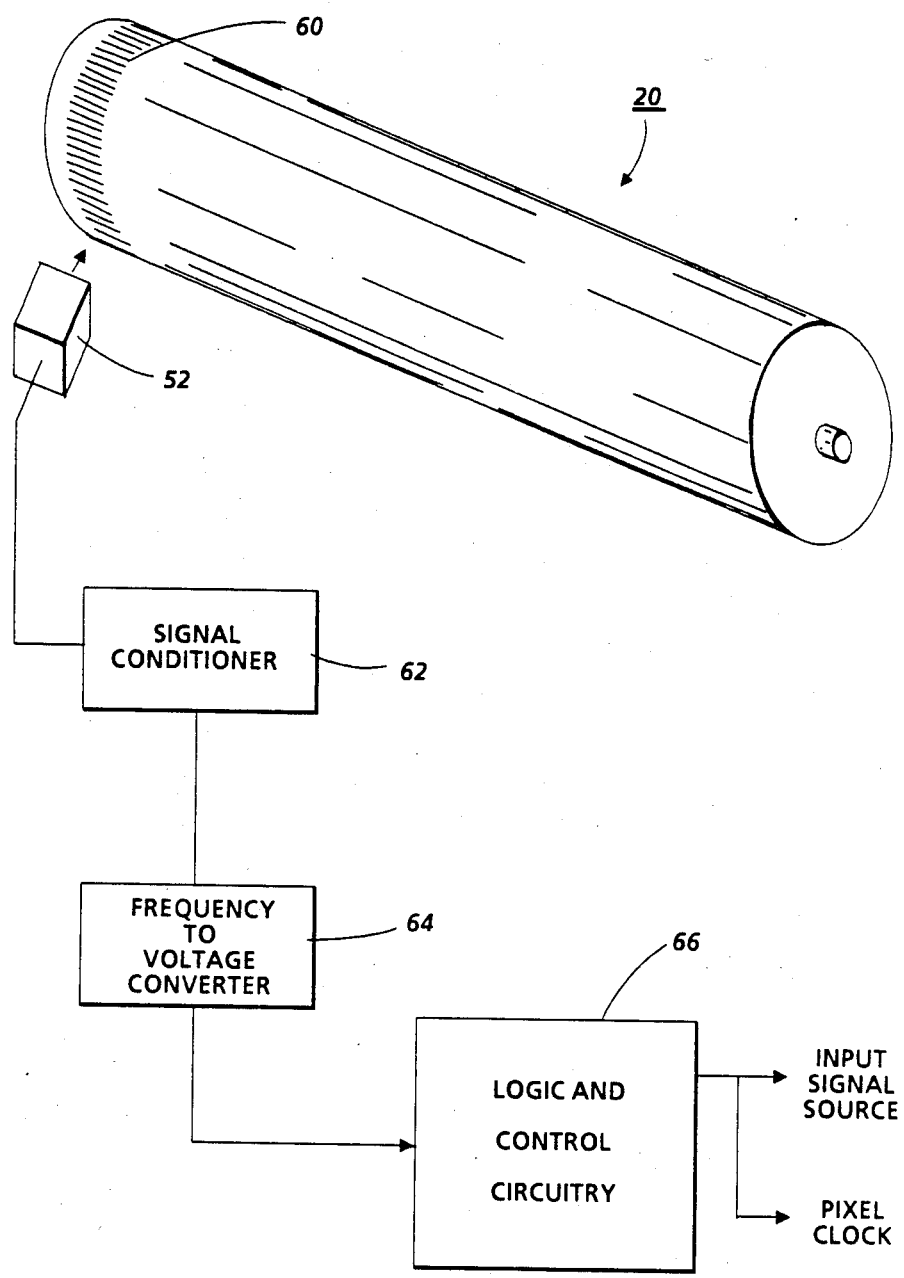
FIG. 3 is a block diagram of the control system for FM and AM correction.

Continuing the description of the invention, outputs from encoder 52 are fed back to a control circuit which varies the irradiance level and the timing operation of the image bar. Referring to FIG. 3, encoder 52 is a fixed beam, high resolution bar code scanner which, in a preferred embodiment, is a Skan-A-Matic (TM) LED S23012. The encoder is positioned a slight distance from a frequency bar chart 60 placed on the periphery of the drum 20 surface. In one embodiment, the encoder is placed approximately 7.6 mm from a 300 line pair/inch chart. As the drum rotates at the process speed of, for example 416 mm/sec, the measured spacing of the signal generated from scanning the movement of chart 60 is proportional to the actual spatial displacement of the chart. As a result, the temporal frequency of the signal is directly proportional to the spatial velocity of the chart. Vibration of the photoreceptor results in velocity motion changes which will be detected and appear in the output of encoder 52 as frequency modulation of the signal about its carrier frequency. The output signal generated is a 3,276 Hz sinusoidal wave with a peak-to-peak amplitude of about 150 mv. The signal is then fed through an AC coupled signal conditioner circuit 62 and amplified 50 times to a zero-to-peak amplitude of about 3.75 volts. The frequency modulated signal is then converted to a voltage output in the frequency to voltage converter 64. The output from converter 64 is then sent to logic and control circuit 66. Outputs from circuit 66 will be generated only if the output of detector 52 includes some component of vibration present in drum 20. If vibration is present, two outputs are generated. One is a velocity signal sent to the input signal source to change the amplitude of the input to image bar 40. The amplitude change results in proportional changes in the radiance output of the image bar (AM correction). A second position signal generated by circuit 66 is sent to the pixel clock, incorporated in bar 40, changing the timing in a direction dependent upon the potential of the output signal.

Figure 4:
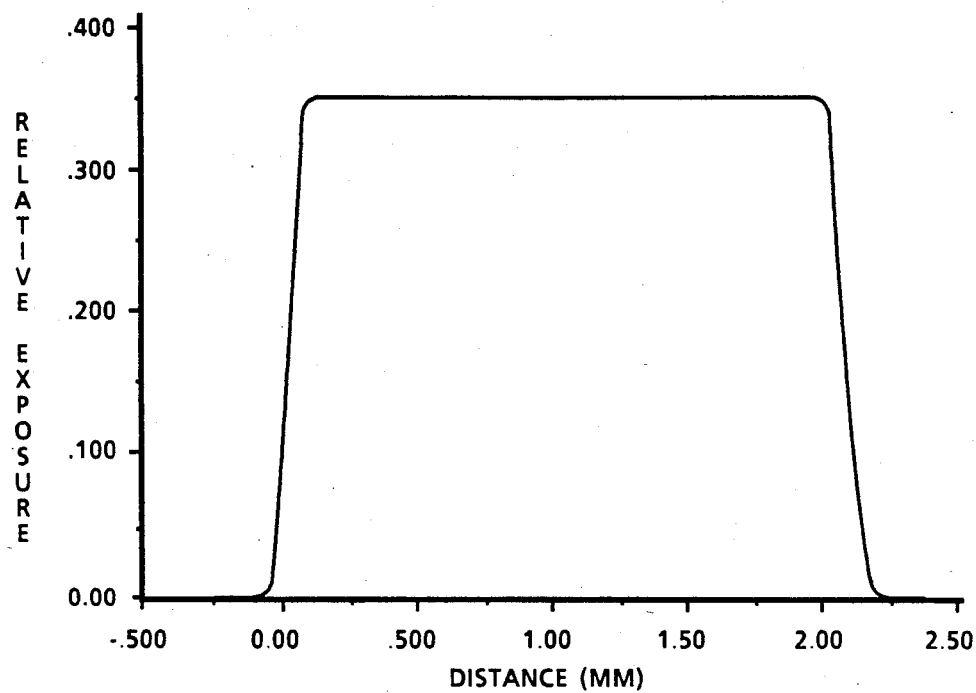
FIG. 4 is a plot of relative exposure vs scan distance for a photoconductor without vibrations.
Figure 5:
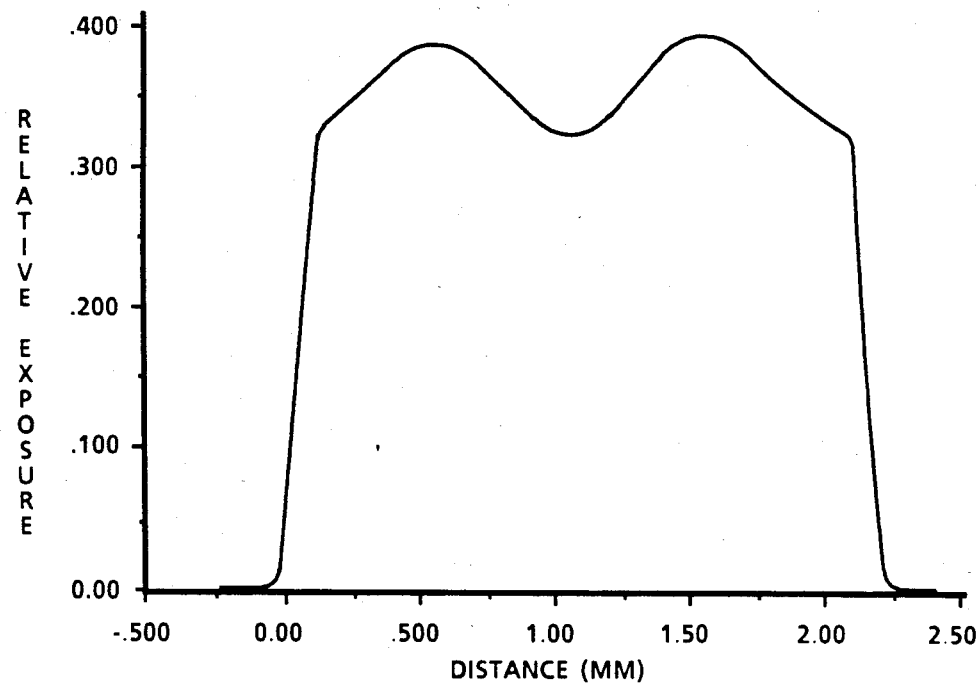
FIG. 5 is a plot of relative exposure vs distance for a vibrating photoconductor.
Figure 6:
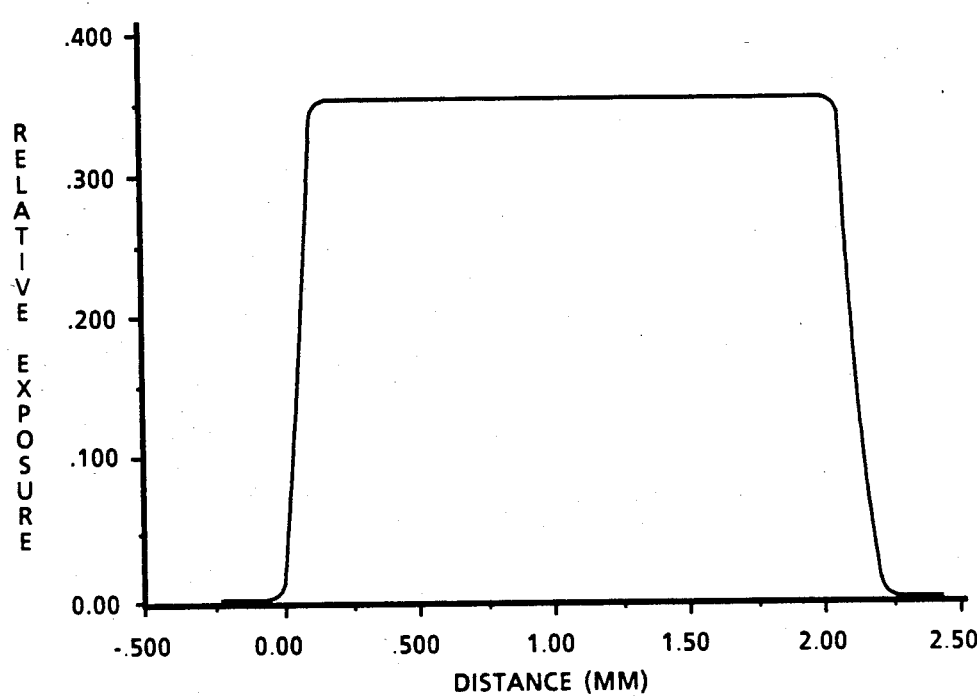
FIG. 6 shows the correction obtained in the FIG. 5 plot by using AM correction.
Figure 7:
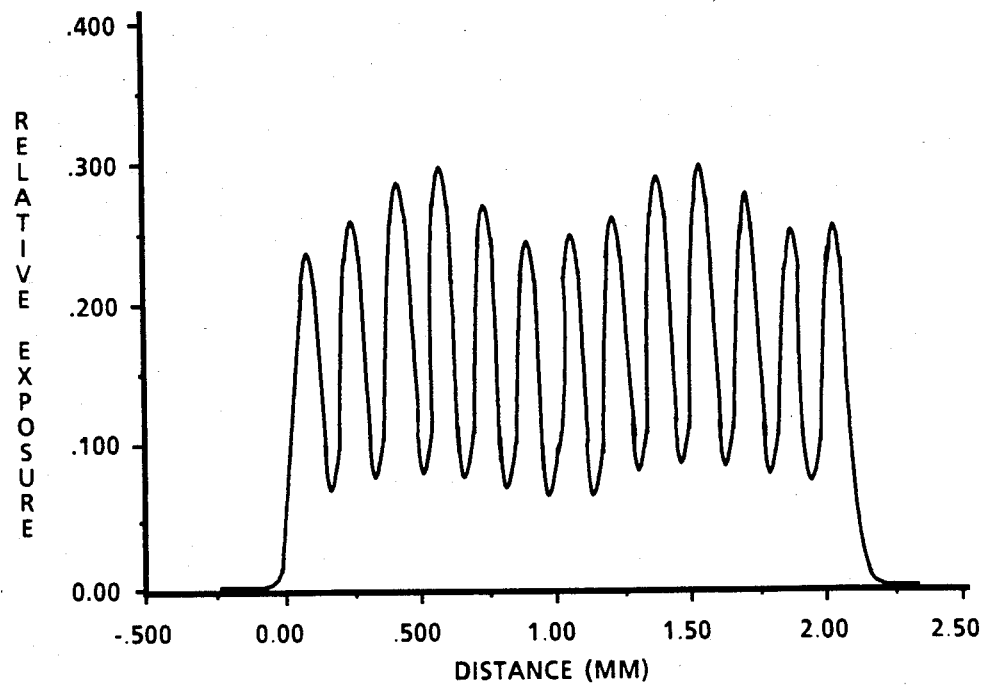
FIG. 7 shows a plot of relative exposure vs distance for a bar target pattern with vibration.
Figure 8:
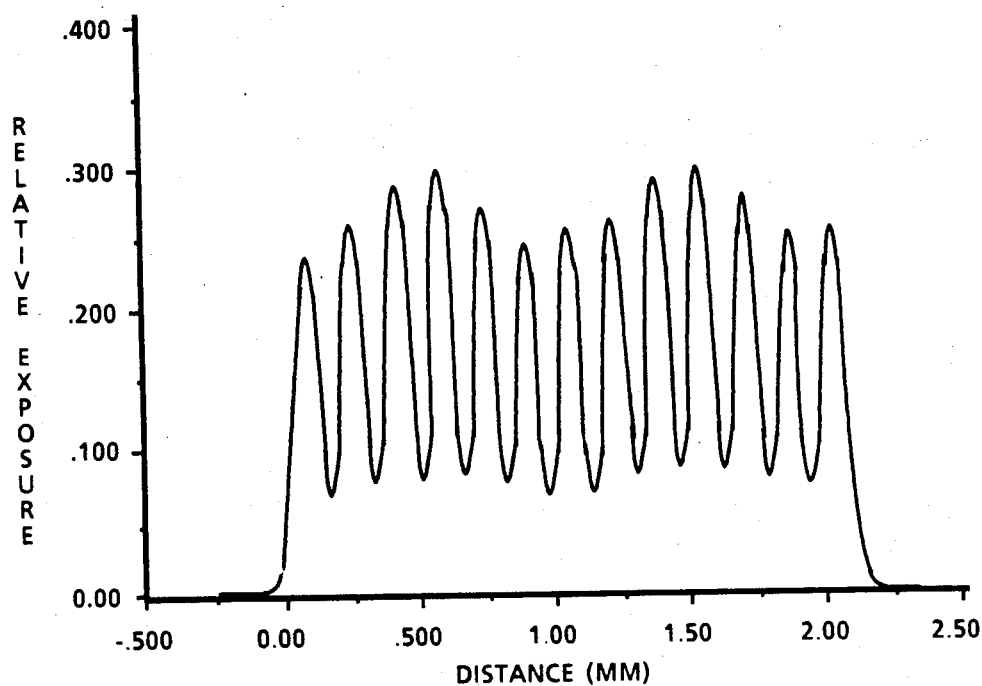
FIG. 8 shows the plot of FIG. 7 with FM correction.
Figure 9:
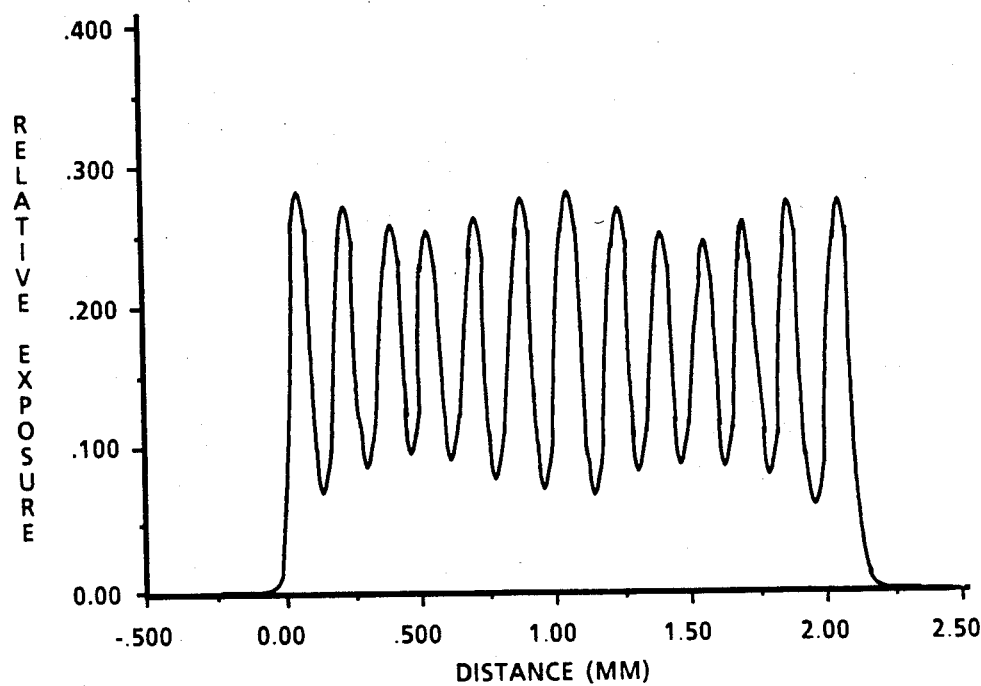
FIG. 9 shows the plot of FIG. 7 with AM correction.
Figure 10:
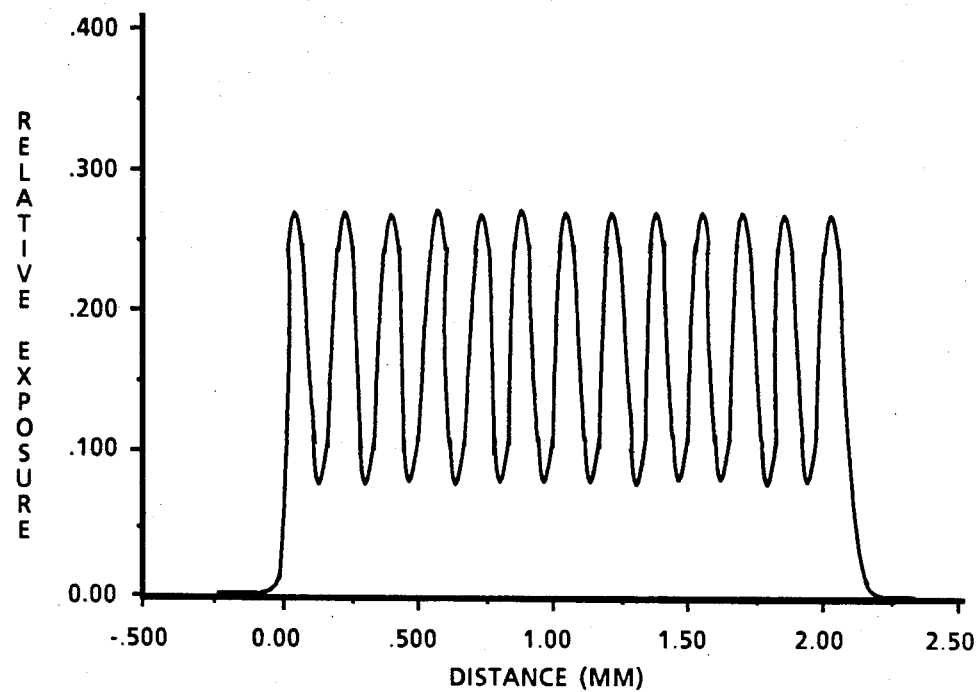
FIG. 10 shows the plot of FIG. 7 with combined AM and FM correction.

The effectiveness of FM correction, AM correction and the combination of both is illustrated by the following examples. FIG. 4 shows the uniform exposure of a solid area obtained with an image bar without drum vibration. The effect of drum vibrations at a spatial frequency $f_s = 1cy/mm$ is shown in FIG. 5. FM correction has a negligible effect since the width of a large solid area is effected very little by vibrations. In this case AM correction essentially solves the problem as shown in FIG. 6. The exposure distribution of a bar target pattern written with vibrations present is shown in FIG. 7. The nonuniformity of the pattern will be eliminated with FM and AM correction. FM correction shown in FIG. 8 does not eliminate the problem, while AM correction alone (FIG. 9) is also not sufficient. The combination of FM and AM correction does eliminate the vibrational modulation, as shown in Figure 10.

While the invention has been described with reference to the particular system disclosed, it is not confined to the details set forth, but is intended to cover such modifications or changes as may come with the scope of the following claims.

What is claimed is:

1. An image bar printing apparatus including an image write bar, a photoconductive member adapted for movement though an exposure station, image signal source means connected to said image write bar, said write bar generating a light output representative of said signal source input, a lens array cooperating with said image bar to form line-like images on said photoconductive member as the member moves through said exposure station, a pixel clock for controlling the on-off time of said image write bar, means for generating electrical signals representative of at least velocity motion chaages in the photoconductive member due to vibrational forces, and logic and control circuitry for operating on said electrical signals and for generating at least a first output signal which adjusts the time-dependent radiance of said image bar to compensate for said velocity motion changes 2. The printing apparatus of claim 1 wherein said logic and control circuitry produces a second signal which adjusts the on-off timing of said pixel clock to compensate for positional changes in said photoconductive member due to vibration.

3. The printing apparatus of claim 1 wherein said imaging member is a rotating photoconductor having a frequency bar chart affixed to its surface, said electrical signal generating means including an encoder detector means positioned so as to be in optical communication with said frequency chart, said detector means adapted to sense deviations in the spatial displacement of the bars on said chart during rotation of said photoconductor and to generate an output representative of said deviation.

* * * * *